UNITED STATES PATENT OFFICE.

THEODORE HYATT, OF NEW YORK, N. Y.

IMPROVEMENT IN COMBINATION ASBESTUS FILLING FOR FIRE-PROOF SAFES AND OTHER STRUCTURES.

Specification forming part of Letters Patent No. 101,268, dated March 29, 1870.

*To all whom it may concern:*

Be it known that I, THEODORE HYATT, of the city, county, and State of New York, have invented certain new and useful Improvements in Fire-Proof Safes and other Structures, of which the following is a specification:

My invention relates to the production of a new combination of asbestus, with liquid or semi-liquid vapor or steam-generating materials, for filling the chambers or spaces, and the cans, tubes, or vessels used in such chambers, between the interior and exterior walls or shells of fire-proof safes and other structures, and doors for the same, when constructed for the purpose of preserving books, papers, bank-bills, coin, gold and silver ware, from injury or destruction by fire.

Asbestus has been noted from the earliest ages for its properties as a non-conductor of heat and incombustibility, being used principally for purposes of cremation by the higher ranks of the ancient Greeks and Romans; but its wonderful powers of capillary attraction seems to have escaped the observation of the world down to the present time, or at least never to have been reduced to any practical utility of value.

My researches and experiments in regard to this remarkable mineral resulted in discovering that it will drink up or absorb three times its own weight of water, which can then be solidified or set by mixing with it plaster-of-paris equal in weight to that of one-third of the asbestus used, and this combination is accomplished without increasing its volume or bulk in the least degree.

I also discovered that owing to the fibrous nature of asbestus it is enabled to perform a most important function in the composition or filling for fire-proof safes and other structures, when combined with any earth or earths, such as plaster-of-paris, Rosendale cement, marble-dust, or pipe-clay, by acting as a bond or ligament to unite and bind such earths together in one interlaced mass, upholding and supporting it at all times, thus preventing any shrinkage or settling away of the fire-proof composition from the walls of the safe during a conflagration, so that, although every atom of water is expelled by heat, the walls of asbestus and earth still retain their full form and dimensions, not permitting the existence of any vacant or empty space within the cans or walls of the safe for the heat to penetrate across, to attack and destroy the book-case and its contents.

As an illustration of the above, I took one hundred and thirty-five grams of water, which completely filled a box two by three inches and one and a half inch deep. This water being turned into a bowl and forty-five grams of ground asbestus mixed with it, the water was absorbed, to solidify which fifteen grams of plaster-of-paris were incorporated with the mass, that in ten minutes began to set, when the whole was refilled into the same box, thus presenting the singular spectacle of a box that was entirely filled by one hundred and thirty-five grams of water, an incompressible element, now containing one hundred and ninety-five grams, or nearly one-half more than its total capacity. These results are vastly different from, superior to, and not attainable by the combination of asbestus, earths, and chemical salts holding water of crystallization, as secured to me by patent of March 8, 1870, No. 100,632.

The above mass of fire-proof composition was placed in a stove-oven, remaining there until all the water was expelled by heat. When taken out, it was found to retain perfectly its full form and size, and weighed precisely sixty grams, the exact equivalent of asbestus and plaster used, thus demonstrating that the whole one hundred and thirty-five grams of water existed in a free condition, ready to be given off in the form of steam when called upon by fire.

These satisfactory results convinced me of the peculiar and surprising adaptability of asbestus, when combined with other suitable materials, for the purpose of rendering safes and other structures fire-proof.

To enable others skilled in the art to which my invention applies to make use of said invention, I will now describe the composition and use of the same in several forms as employed by me in practice, first describing the materials used and how combined.

First, I take asbestus of any suitable form or condition, as slabs, blocks, ground or crushed, and wet it to any desirable extent with any steam-producing materials, as water, or solutions of glycerine, gelatine, or mucilage; but in all cases I prefer pure water alone.

Second, I take asbestus combined with any earth or earths, as Rosendale cement, plaster-of-paris, pipe-clay, or marble-dust, in the proportions of two pounds of asbestus to one pound of earth, (of which earths I prefer plaster-of-paris,) and wet them sufficiently with water or any of the steam-producing materials heretofore mentioned.

Third, I combine asbestus with any chemical salt or salts containing water of crystallization, in proportions of three pounds of asbestus to two pounds of the salts, of which salts I prefer Glauber's salts.

Fourth, I take asbestus combined with any earth or earths, and any chemical salt or salts containing water of crystallization, as alum, sal-soda, borax, Epsom and Glauber's salts, (which last-named one I prefer to use,) in the proportions of one pound of Glauber's salt to one pound of plaster-of-paris and one pound of asbestus, to be used in dry condition, or, if preferred, wet with proper amount of water or any of the steam-producing solutions described heretofore.

In the above fire-proof compounds I do not confine myself to the precise proportions of asbestus and earth or earths and chemical salt or salts, as stated, as they may be varied to any extent found most effective in practice.

Having described the materials and their proportions, as combined and used in my new fire-proof composition for safes and other structures, I will now describe several methods adopted in applying the same to filling safes, bank-vaults, and other structures and doors for the same.

First, I construct a safe with inner and outer shells or walls of metal, or the inside one of wood, and forming the frame-work of the book-case, leaving about six inches between the walls in all directions, which constitutes the fire-proof chambers of the safe. The joints and surfaces of said walls, looking into the fire-proof chambers, are first well covered with one or more coats of paraffine or any materials impervious to water, to prevent oxidation of the metal and transmission of moisture from the fire-proof composition into the book-case to dampen and mold its contents. This being done, either of the heretofore-described compounds of asbestus is then filled in closely between the walls until no part is left vacant, the door also being filled in the same manner, when the safe is finished, and the remaining joints sealed up with some water-proof materials, to prevent evaporation.

Second, I make a safe with an external shell of iron, and then an inner safe of gutta-percha, india-rubber, or some non-corrosive materials, like copper, and made with double walls, about six inches apart, to receive the fire-proof composition, its shape being exactly like the external shell, so that, when in position, it just fills the place. This makes the construction in effect two safes, one within the other, the interior one being filled compactly with either of the above-described compounds of asbestus. The inner safe may be made somewhat smaller than the outer one, and the intervening space filled with any slow conductor of heat, like asbestus, plaster-of-paris, or either of the non-heat-conducting compounds described in my patents of December 28, 1869, No. 98,381, and March 8, 1870, No. 100,632.

Third, I construct safes of iron, having inner and outer shells about six inches apart, the intervening space being occupied by cans or vessels made of gutta-percha, india-rubber, copper, or other non-oxidizable material, and of such size and form as to fit, respectively, the top, bottom, and each side of the safe; or these vessels may be divided into a series of smaller ones, in shape like bricks or long flat tubes, which are filled with either of the heretofore-described asbestus compounds, and hermetically sealed.

Fourth, I construct safes of iron with inner and outer walls or shells about six inches apart, a portion of which space, usually one-half, I occupy with cans, tubes, or vessels placed in suitable positions, and filled with either of the heretofore-described asbestus compounds, while the remaining and unoccupied space between such vessel and wall or walls is filled with any earth or earths, alone or combined with any chemical salt or salts holding water of crystallization, as heretofore mentioned, or occupied by other cans or vessels containing water or other steam-producing substances, or asbestus alone.

Fifth, I sometimes construct the closet or book-case with double shells, between which, as additional security against fire, I form a lining of either of the heretofore-described asbestus compounds, or of asbestus alone.

Having fully described my invention, what I claim therein as new, and desire to secure by Letters Patent, is—

1. The use of asbestus in any suitable form or condition, when combined with any liquid or semi-liquid vapor or steam-generating materials, such as water, or solutions of glycerine, gelatine, or mucilage, and used as a filling for fire-proof safes constructed in either of the modes heretofore described, and also as a filling for the cans, tubes, or vessels used in said safes.

2. The use of asbestus, when combined with any suitable earth or earths and liquids, semi-liquids, or solutions, as above mentioned, and used as a filling for fire-proof safes, when constructed in either of the modes heretofore set forth, and also as a filling for the cans, tubes, or vessels used in said safes.

3. The use of either of the foregoing-described combinations of asbestus, or of asbestus alone, when used as a filling or lining for double-shelled closets or book-cases of fire-proof safes.

4. The use of asbestus as an absorbent of liquids, and as an indestructible fibrous bond, ligament, or connecting medium for binding, supporting, and uniting together the earth or earths employed in a composition or filling for fire-proof safes and other structures.

THEODORE HYATT.

Witnesses:
S. C. POMEROY,
S. D. FARREN.